United States Patent
Ceccato et al.

(10) Patent No.: US 10,661,813 B2
(45) Date of Patent: May 26, 2020

(54) SYSTEM FOR MOVING ELECTRICALLY POWERED APPARATUSES

(71) Applicant: I MOD S.A.S DI CECCATO LUIGI & C, Pero (Milan) (IT)

(72) Inventors: Luigi Ceccato, Pero (IT); Miro Vlasanovic', Pero (IT)

(73) Assignee: I MOD S.A.S DI CECCATO LUIGI & C, Pero, Milan (IT)

( * ) Notice: Subject to any disclaimer, the term of this patent is extended or adjusted under 35 U.S.C. 154(b) by 245 days.

(21) Appl. No.: 15/532,103

(22) PCT Filed: Dec. 1, 2015

(86) PCT No.: PCT/IB2015/059246
§ 371 (c)(1),
(2) Date: Jun. 1, 2017

(87) PCT Pub. No.: WO2016/088035
PCT Pub. Date: Jun. 9, 2016

(65) Prior Publication Data
US 2017/0267257 A1 Sep. 21, 2017

(30) Foreign Application Priority Data
Dec. 2, 2014 (EP) .................................... 14195880

(51) Int. Cl.
| | |
|---|---|
| *B61B 3/02* | (2006.01) |
| *F16M 11/18* | (2006.01) |
| *F16M 11/42* | (2006.01) |
| *F21V 17/02* | (2006.01) |
| *F21V 21/005* | (2006.01) |

(52) U.S. Cl.
CPC ............... *B61B 3/02* (2013.01); *F16M 11/18* (2013.01); *F16M 11/425* (2013.01); *F21V 17/02* (2013.01); *F21V 21/005* (2013.01)

(58) Field of Classification Search
CPC .......... B61B 3/02; F16M 11/10; F16M 11/18; F16M 11/425; B61C 13/04; H01R 25/14; H01R 25/142; H01R 25/145
USPC ........................................................ 104/112
See application file for complete search history.

(56) References Cited

U.S. PATENT DOCUMENTS

| | | | | |
|---|---|---|---|---|
| 2,244,216 A | * | 6/1941 | Pieper ...................... | H02P 9/06 180/65.25 |
| 2,961,499 A | * | 11/1960 | Mageoch ................. | H02G 5/04 191/23 A |
| 3,636,883 A | * | 1/1972 | Wesener ............... | B61L 23/005 104/50 |
| 3,935,380 A | | 1/1976 | Coutta | |

(Continued)

FOREIGN PATENT DOCUMENTS

| | | | | |
|---|---|---|---|---|
| CN | 101242982 | | 7/2005 | |
| CN | 101242982 A | * | 8/2008 | ................ B60L 5/40 |

(Continued)

*Primary Examiner* — Scott A Browne
(74) *Attorney, Agent, or Firm* — Albert Bordas, P.A.

(57) ABSTRACT

A system for moving electrically powered apparatuses is described, comprising at least one fixed supporting track along which the apparatuses are moved. The track is made by a tubular section bar having an opening extending for its whole length and at least one carriage is movably housed inside the track. The system further comprises at least one motor for moving the carriage in the track.

17 Claims, 11 Drawing Sheets

(56) References Cited

U.S. PATENT DOCUMENTS

| | | | | |
|---|---|---|---|---|
| 5,334,037 A * | 8/1994 | Gabrius | ............... | H01R 25/142 |
| | | | | 439/118 |
| 5,584,576 A | 12/1996 | Wei Hong | | |
| 6,264,017 B1 * | 7/2001 | Evans | ....................... | B60L 5/36 |
| | | | | 104/93 |
| 6,274,817 B1 * | 8/2001 | Jaakkola | ................ | H01R 25/14 |
| | | | | 174/68.1 |
| 2006/0150857 A1 * | 7/2006 | Pouliot | .................... | H02G 1/02 |
| | | | | 104/112 |
| 2007/0042625 A1 * | 2/2007 | Otto | ..................... | H01R 25/142 |
| | | | | 439/212 |
| 2014/0116282 A1 * | 5/2014 | Horihan | ................ | B61L 23/002 |
| | | | | 104/89 |
| 2014/0263866 A1 | 9/2014 | Hemmer | | |

FOREIGN PATENT DOCUMENTS

| | | | | | | |
|---|---|---|---|---|---|---|
| FR | 2586223 | | | 8/1985 | | |
| GB | 2277069 | | | 2/1993 | | |
| GB | 2277069 | A | * | 10/1994 | ................ | B60L 5/40 |
| GB | 2287277 | A | * | 9/1995 | ............. | E05B 81/25 |
| WO | 8904437 | | | 11/1988 | | |

* cited by examiner

SYSTEM FOR MOVING ELECTRICALLY POWERED APPARATUSES

FIELD OF THE INVENTION

The present invention concerns a system for moving electrically powered apparatuses, such as for example light sources for the lighting, video cameras for capturing fixed or moving images, sensors for the presence detection or the like.

PRIOR ART

Systems are known in the art, which are mainly intended for the lighting of inner or outer environments, in which one or more light sources are hung at one or more tracks. These can also be conductive of electric power supply for the light sources, for example spotlights or the like. The light sources can be placed along tracks and fixed in prearranged points depending on the areas in which a given amount of environment lighting has to be guaranteed.

The U.S. Pat. No. 5,584,576 and the International Patent Application n. WO 8904437 provide some examples of this typology of known systems.

In any case, these systems have fixed light sources. This is a limit inevitably causing also a power consumption greater than that effectively necessary.

Recently, also because the diffusion of techniques and installations in the home automation field are increasing, there is the need of providing more versatile systems, which allow exploiting more extensively installations of electrical apparatuses of different types in inner or outer environments.

Object of the present invention is then to provide a system that allows moving the electrically powered apparatuses, for example one or more light sources, along a given path.

Another object of the present invention is to provide a system of the afore mentioned type that allows moving also other types of electrically powered apparatuses, for example projectors, microphones, audio diffusers, devices for the biometric identification, devices for the retinal identification and/or sensors.

An additional object of the present invention is to provide a system of the afore mentioned type that can be installed indifferently in inner or outer environments, either public or private.

SUMMARY OF THE INVENTION

These objects are achieved according to the invention through a system according to claim 1. Further specific characteristics of the present invention are reported in the dependent claims.

In general, a system for moving electrically powered apparatuses comprises at least one fixed support, for example a track, along which the apparatuses are moved. According to an embodiment of the present invention, the track is made by a tubular section bar having an opening extending for its whole length. The system further comprises at least one carriage movably housed inside the track and at least one motor so that the carriage is moved in the track.

Therefore, the carriage can move inside the track and an electrical apparatus constrained thereto can be moved through the opening on the track, for example a device for projecting a light beam, or else a device for projecting or displaying images, a holographic projector, a sensor for capturing images or movements or the like.

The carriage can by constituted for example by a single unit for the movement along a straight direction, or else by two or more separated units connected one to another by a bracket. In this latter case, each unit is preferably rotatable with respect to the bracket around an axis perpendicular to the movement direction of the carriage. This allows the carriage to be moved also along curvilinear lengths of the track.

It is possible to connect the carriage to a platform for supporting one or more electrically powered apparatuses. In this case, the platform is arranged outside the track and connected mechanically to the carriage by the bracket that comes out through the track opening. Advantageously, the so-obtained platform allows supporting also more than one apparatus, for example a video camera and light sources combined therewith, which can be anyway operated one separately from another.

In a possible embodiment, the motor is an electric motor housed in the carriage, for example in one of the units composing the carriage. The motor of the carriage is powered, along with the moved electrical apparatuses, by conductors arranged inside the track. Advantageously, this allows the installation to become electrically safe, i.e. without cables or outer conductors, and at the same time pleasing from the aesthetic point of view.

At least one battery can be advantageously provided, which has the function of buffer battery able to power the electric motor and the moved electrical apparatuses, in order to guarantee the system operation when the electric network is down. The battery recharge can be achieved, for example, by the same conductors placed inside the track, or else by outer contacts, otherwise by a "wireless" system able to provide the recharge power through electromagnetic induction, for example.

Alternatively, the electric power of the motor and/or the apparatuses can be provided from one or more rechargeable and/or interchangeable batteries, i.e. batteries being recharged autonomously and independently from the system, which are then assembled on the carriage, for example in installations in which the mains supply is not available, or during the installation of the system for setting and programming the operating parameters, or else also for tests or operations of maintenance and repair of the system before the mains connection.

The track comprises, in its inside, a guide channel for the carriage and can also comprise one or more service channels. The service channels can be used, for example, to allow the passage of conductors that can supply possible fixed lights placed along the track, for example emergency lights or the like, as well as possible control units for room safety systems, for example sensors for detecting anomalous conditions in the surrounding environment (e.g., gases, fumes, temperature, etc.). The control units can also be provided with a receiver of the wireless type to drive, for example, the systems connected therewith to be enabled or disabled.

The track can be advantageously constituted by modular elements connectable one to another by repositionable clutches or pins. The modular elements can have, for example, prearranged lengths and can be made in different shapes, for example elements with straight development and elements with curvilinear development, anyway able to be fitted to form several track arrangements. The so-realized track can then have one or more straight lengths or else also one or more curvilinear lengths.

A so-realized track makes itself then available for a lot of installing solutions. For example, the track can be completely hung for its whole length at a given height from the ground or the floor of the environment in which it is installed, or else it can comprise a portion constrained by one end thereof to the ground, floor or wall of the environment in which it is installed.

From the mechanical point of view, the carriage can be moved for example through a cogwheel driven by the electric motor and engaged on a rack integral with the track, the electric motor being housed in the carriage. This allows implementing systems in which the track comprises both straight and curvilinear lengths.

In alternative, in case in which the track has only a straight development, the carriage can be moved by a motor, the latter being inside or outside the carriage and transmitting the motion by the use of a cogwheel and a cog belt, or else by the engagement of a nut screw and a worm.

The motor of the carriage and/or the electrically powered apparatuses are electrically powered by contacts sliding on a plurality of conductors housed inside the track and implemented, for example, as flat conductive lines. In alternative or in combination, the electric power supply can be implemented through flexible conductors arranged inside a cable-support chain housed inside the track or through conductors that can be coiled. Advantageously, the power system can comprise at least one battery having the function of buffer battery and placed, for example, on the carriage, on the platform or in the track, in order to provide electric power supply if the mains supply is down.

In one embodiment, at least one local control unit arranged in the track, carriage or platform, can be further provided, which can be equipped for example with a wireless receiver for driving the movement of the carriage and/or the activation of the electrically powered apparatuses, and at least one remote control unit for transmitting control signals to said local control unit can be provided.

For example, the local control unit can be programmed for receiving control signals from a dedicated remote control, or else also through the signals of a portable communication device, such as a smartphone or the like.

BRIEF DESCRIPTION OF THE DRAWINGS

Further characteristics and advantages of the present invention will be more evident in the following description, for illustrative and not limitative purposes, referring to the attached drawings, wherein.

MODES FOR CARRYING OUT THE INVENTION

Figure 1:
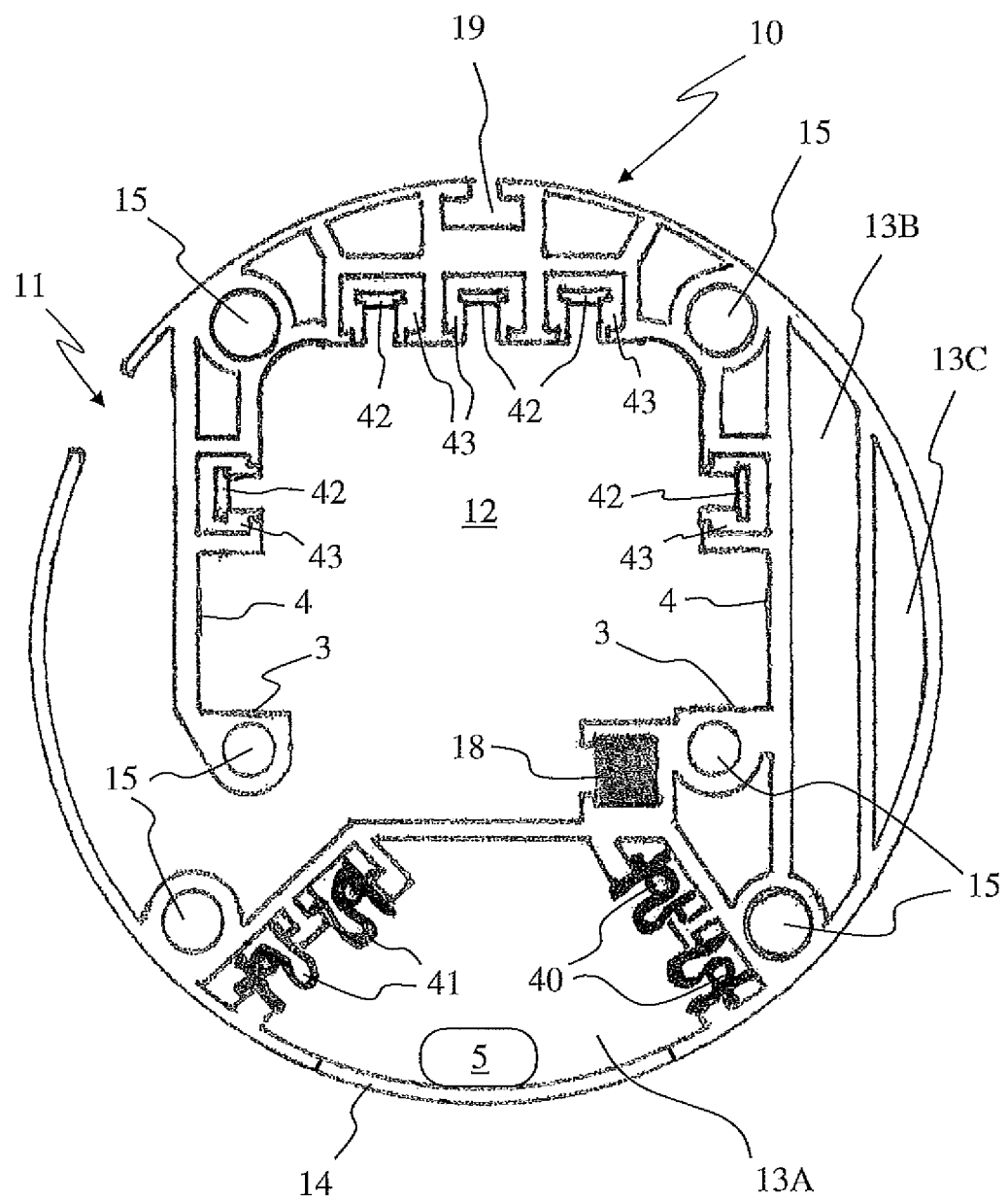
FIG. 1 is cross section view of a track according to a possible embodiment of the system of the present invention.
Figure 2:
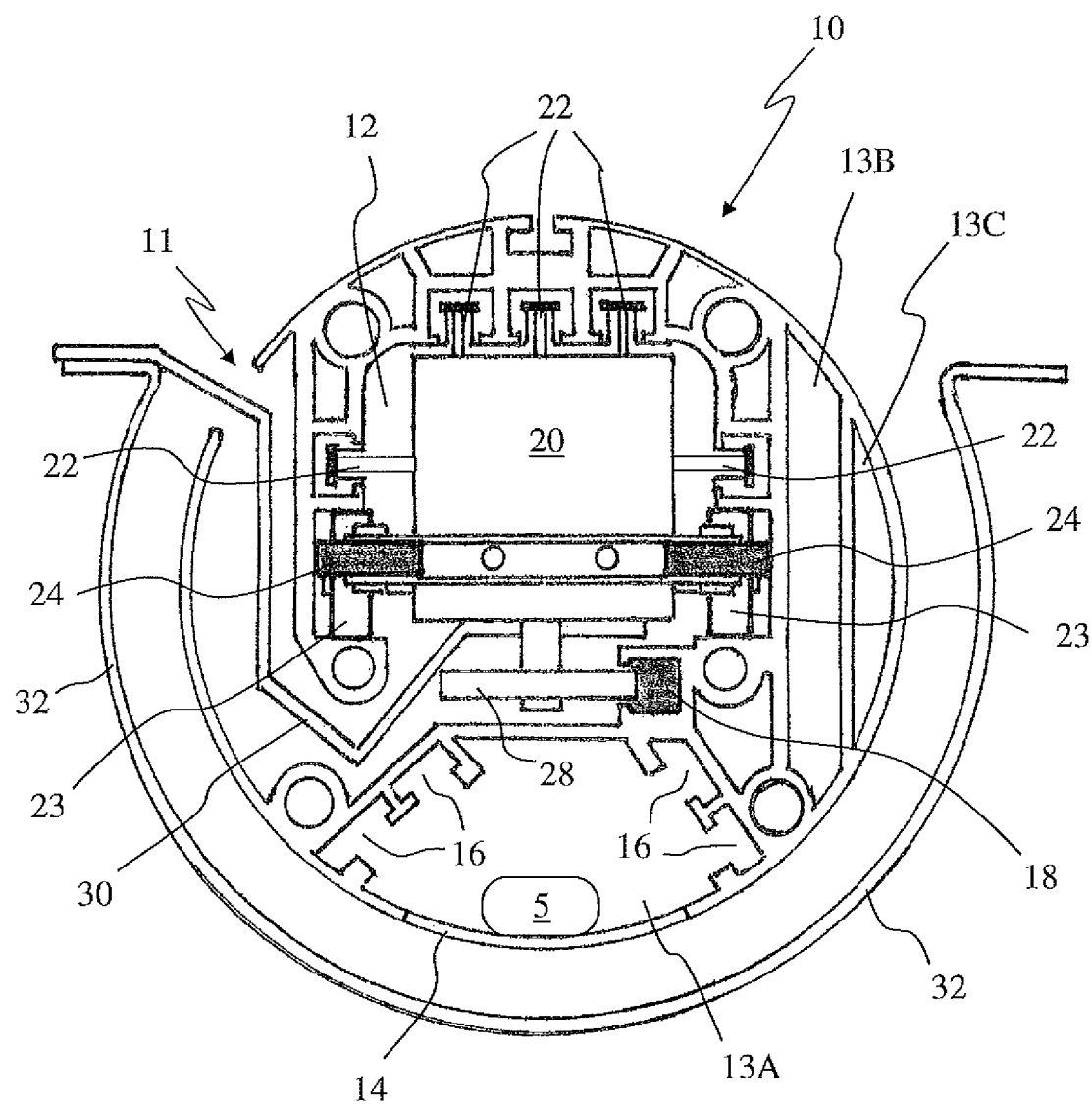
FIG. 2 is a view similar to that of FIG. 1 with also the carriage and additional details of the embodiment of the system according to the invention.

In FIGS. 1 and 2, a track 10 is represented in cross section and constituted by a tubular section bar made of a light material, such as for example an aluminum alloy or PVC, having an opening 11 extending for its whole length. The track 10 comprises, in its inside, a guide channel 12 for a movable carriage 20 (FIGS. 2, 3A) and can comprise one or more service channels 13A, 13B and 13C.

The service channels 13A-13C can be used so that the conductors 40 having a round section can be passed, such as for example those represented in FIG. 1 in the channel 13A, which are hold in position by appropriate seats 16 inside the section bar (FIG. 2) by means of insulators 41. Removable portions 14 can be provided, for example, along the service channel 13A-13C so that the windows for reaching the inside of the section bar can become vacant and the possible installation of mounted and fixed lights, or devices 5 for controlling the system, is allowed, for example devices for receiving and/or transmitting signals, programmable devices for controlling sensors or the like, placed inside one or more service channels 13A-13C. At the side opposite to the service channel 13A, the section bar constituting the track 10 is provided with a groove 19 in which supports can be housed so that the track 10 is hung.

The track 10 can be used, for example, by connecting the modular elements one to another, so that the track can be implemented in different configurations by using a little number of straight and/or curvilinear lengths. The connection between various portions can be achieved, for example, by pins that can be inserted in holes 15 of each section bar.

Furthermore, flat conductors 42 are arranged inside the channel 12, which are housed in appropriate seats of the section bar by interposing electrical insulators 43. As visible in FIG. 2, the flat conductors 42 are intended to supply the corresponding sliding contacts 22 integral with the carriage 20 which moves inside the channel 12. In the illustrated embodiment in FIG. 2, a bracket 30 is connected to the carriage 20 and comes out from the opening 11. A platform 32 is mechanically connected to the bracket 30 and arranged outside the track 10 for supporting one or more electrically powered apparatuses.

Figure 3A:
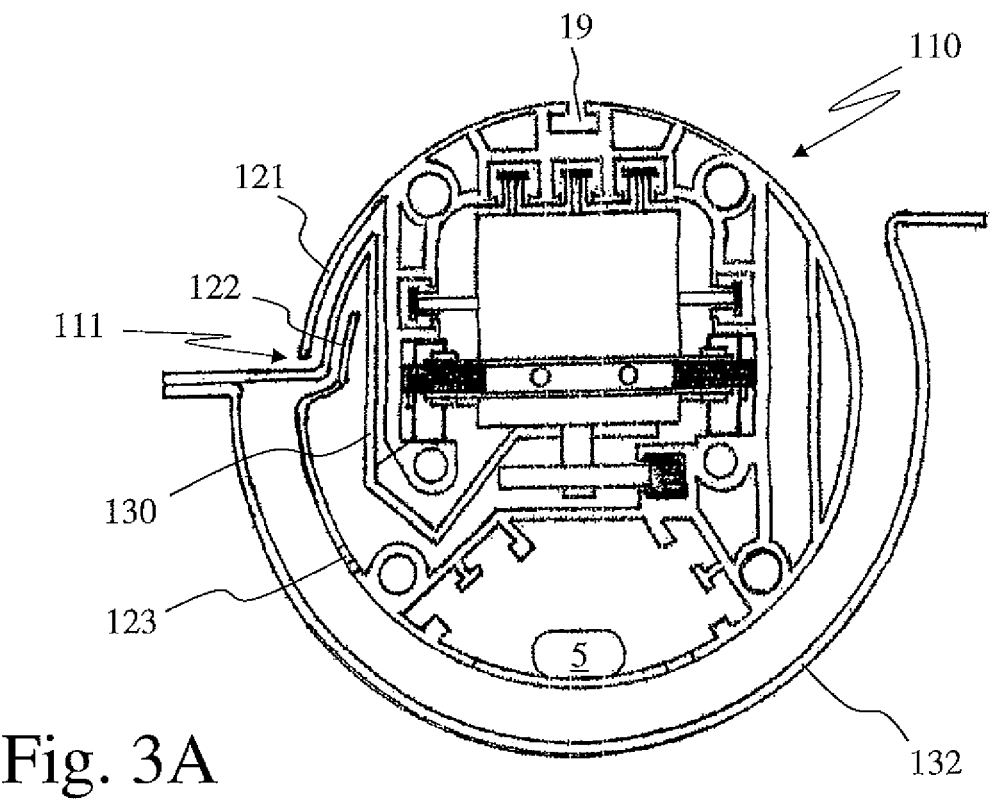
FIGS. 3A and 3B are a front view and a bottom perspective view, respectively, of another embodiment of the track, which is particularly adapted to be installed in outer environments.
Figure 3B:
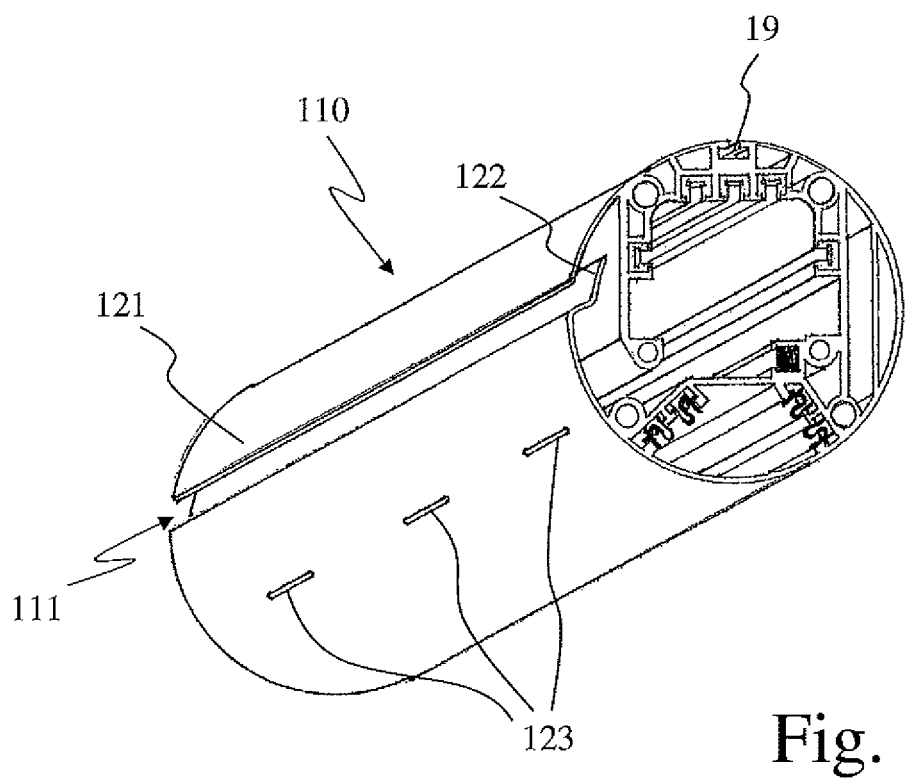

In FIGS. 3A and 3B another embodiment of a track 110 is illustrated, which is particularly suitable for the installation in outer environments. With respect to the embodiment illustrated in FIGS. 1 and 2, the track 110 is provided with a longitudinal opening 111 formed between an outer limb 121 of the section bar, the outer limb being overlapped by an inner limb 122 of the section bar so that the water is not allowed entering the track 110, most of all when the track 110 is installed as hung through hooking means housed in the groove 19.

The bracket 130 is then shaped differently from the bracket 30 illustrated in FIG. 2, in such a way that it can come out correctly from the opening 111 and the movement with the platform 132 is allowed.

Anyway, openings 123 along the track 110 are provided to discharge possible water infiltration also in case in which the track 110 is installed facing differently than suspended.

The remaining features not distinctly mentioned or illustrated by reference numeral in FIGS. 3A and 3B are the same of those already illustrated in the embodiments of FIGS. 1 and 2.

Figure 4:
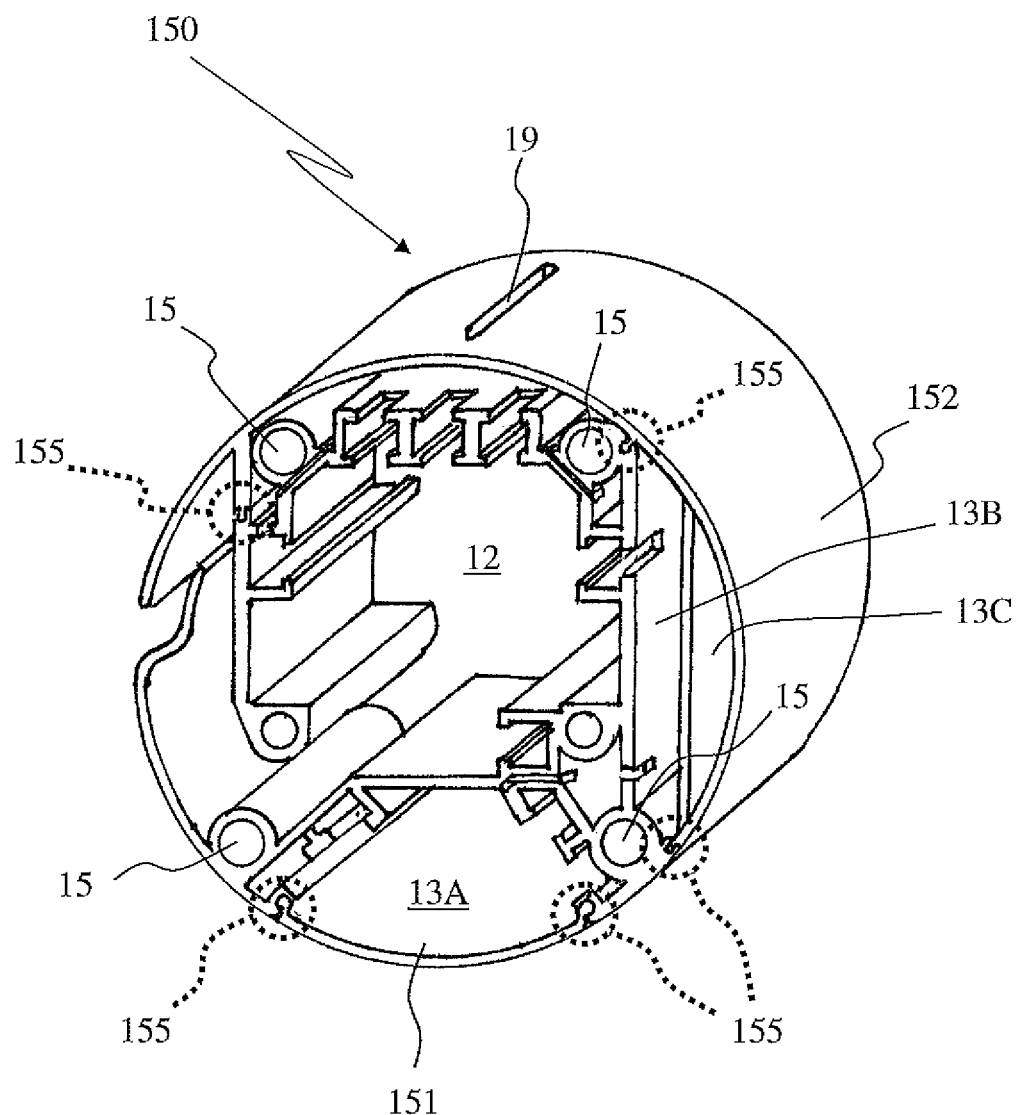
FIG. 4 is a perspective view illustrating a joint portion for the track of FIGS. 3A and 3B.

In FIG. 4 it is represented a joint portion 150 for a track 110 shaped as in the embodiment illustrated in FIGS. 3A and 3B. The joint portion 150, which can have a length smaller than the modular elements composing the track, comprises particularly removable portions 151 and 152 which can be repositioned by suitable interlocked connecting sections encircled in FIG. 4 and identified by numeral reference 155. The removable portion 151 allows, for example, to reach the length of the service channel 13A, whereas the removable portion 152 allows, for example, to reach the guide channel 12 and one or more of the service channels 13B and/or 13C. That allows, for example, to implement and/or check the system connections to the mains also when the track is already installed.

The holes 15 at the ends of the joint portion 150 can also be used for the fastening to the ground, floor, environment wall or to any other suitable support.

Figure 5A:
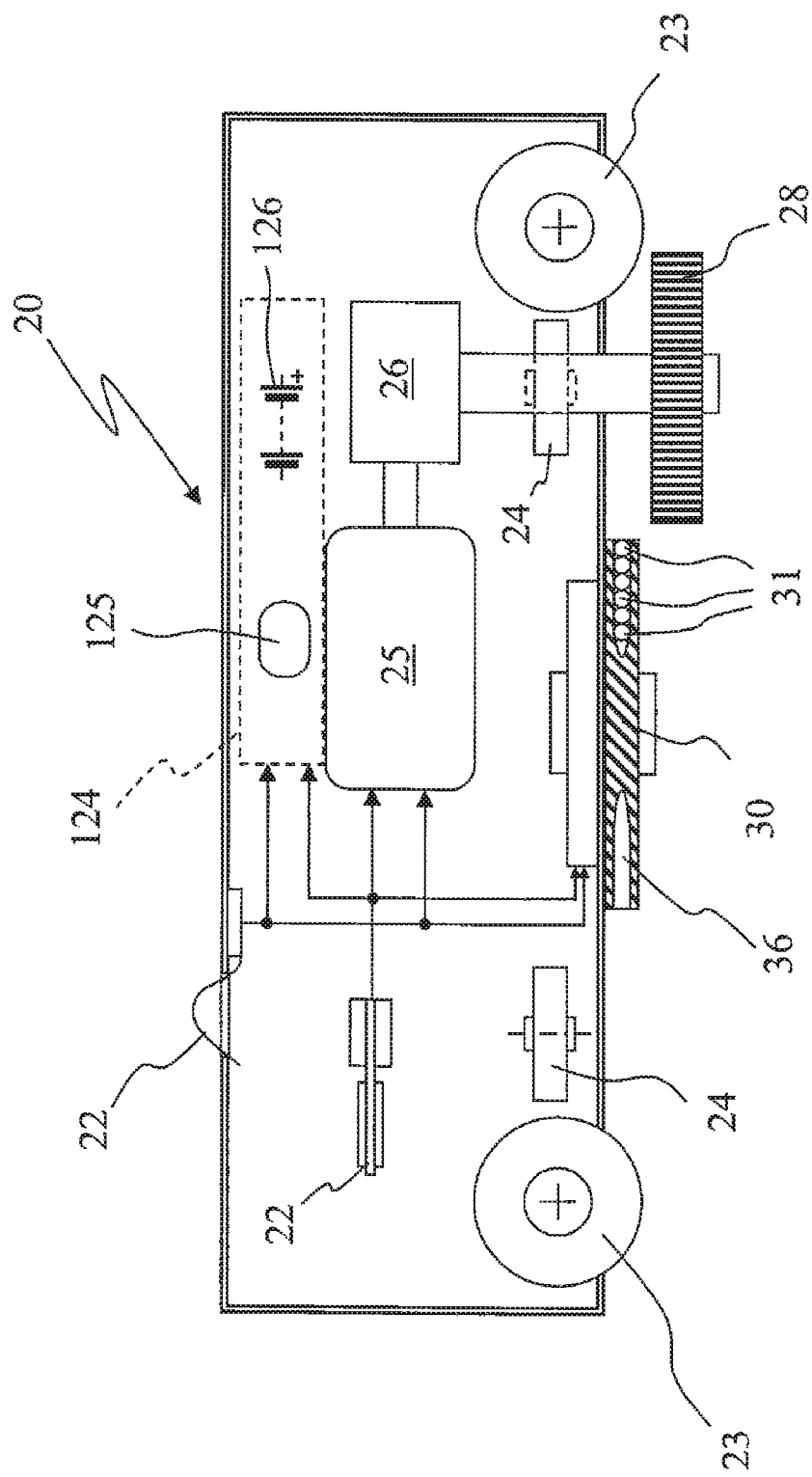
FIG. 5A is a longitudinal section view of a first embodiment of a carriage of the present invention.
Figure 5B:
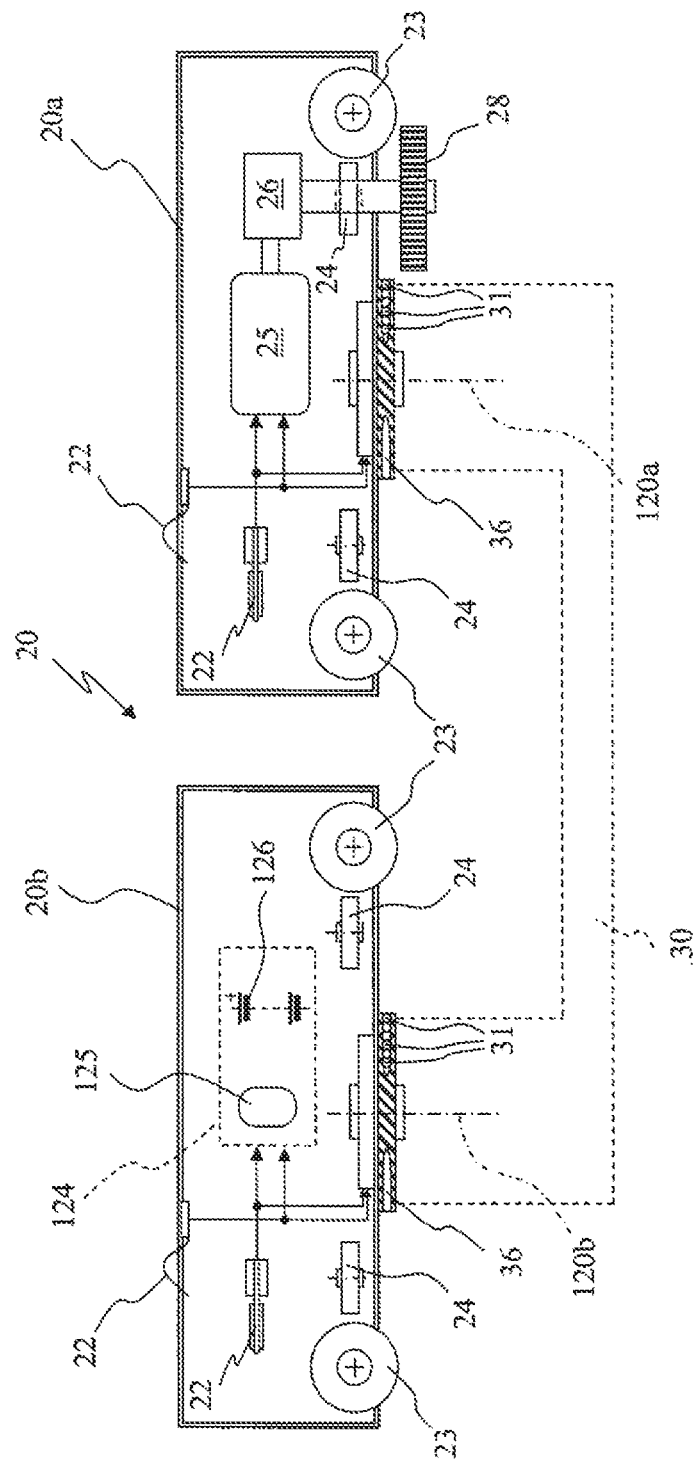
FIG. 5B is a longitudinal section view of a second embodiment of a carriage of the present invention.

The carriage 20 represented in FIGS. 2 and 3A along a cross section inside the track 10 and 110, can be implemented in different shapes, as illustrated in the longitudinal section views of FIGS. 5A and 5B.

In FIG. 5A an embodiment is represented, in which the carriage 20 is constituted by a single unit moved by a cogwheel 28 coupled to a rack 18 integral with the track 10. This embodiment lends itself to be used in tracks having a straight development.

The carriage 20 comprises supporting wheels 23 sliding along the surfaces 3 of the channel 12 and rests laterally on the surfaces 4 of the channel 12 through bearing wheels 24.

The carriage 20 is moved by an electric motor 25, electrically powered through sliding contacts 22, which rotates the cogwheel 28 through a reduction assembly 26. A circuitry 124 can be housed in the single unit constituting the carriage 20, the circuitry including for example controlling circuits 125 and one or more batteries 126 having the function of buffer batteries which guarantee the system operation also if the electric power of the mains is absent. The batteries 126 can be charged with the electric power supplied through the sliding contacts 22 or through outer contacts, or else through a wireless system, for example through electromagnetic induction along one or more track lengths in which the carriage 20 moves.

In alternative, the batteries 126 can be of rechargeable and/or interchangeable type, i.e. batteries that are charged outside the carriage, without the need of drawing power from the sliding contacts 22, and then used in substitution of one or more dead batteries present in the carriage.

Figure 6A:
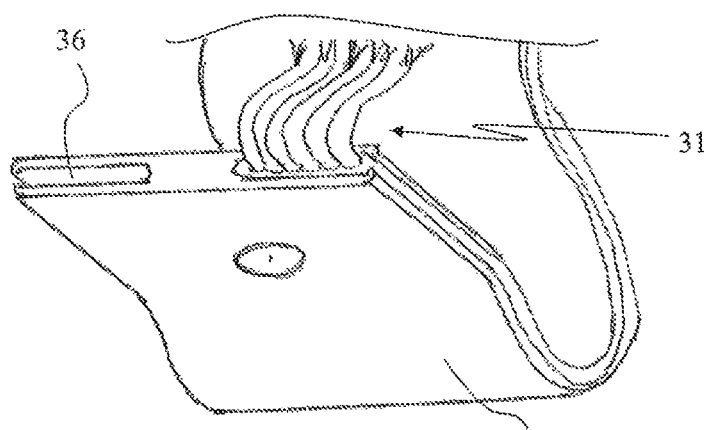
FIG. 6A is a perspective view of a detail of the bracket connected to the carriage represented in FIGS. 5A and 5B.

A bracket 30 (or 130) is steadily fixed to the single unit of the carriage 20, which advantageously comprises the side grooves 36 for housing the flexible conductors 31 visible with greater detail in FIG. 6A, which supply the electric power available from the sliding contacts 22 to the electrical apparatuses supported by the platform 32.

In the embodiment of FIG. 5B, the carriage 20 is formed for example by two units 20a and 20b, which are connected one to another by the bracket 30 (or 130) with the possibility of rotating each unit around the respective axes 120a and 120b.

Also in this embodiment the carriage 20 is moved by a cogwheel 28 coupled to a rack 18 integral with the track 10.

Both the units 20a and 20b of the carriage 20 comprise supporting wheels 23 sliding along the surfaces 3 of the channel 12 and rest laterally on the surfaces 4 of the channel 12 through bearing wheels 24.

The carriage 20 is moved by an electric motor 25 arranged in the unit 20a and is electrically powered through the sliding contacts 22. The motor 25 rotates the cogwheel 28 through a reduction assembly 26.

The unit 20b comprises, in its turn, sliding contacts 22 and the same wheels 23 and 24 that are on the unit 20a. The circuitry 124 can be housed in the unit 20b, the circuitry including controlling circuits 125 and one or more batteries 126 having the function of buffer batteries which guarantee the system operation also if the electric power of the mains is absent. The batteries 126 can be charged with the electric power supplied through the sliding contacts 22 or through outer contacts, or else through a wireless system, for example through electromagnetic induction along one or more track lengths in which the carriage 20 slides.

Also in this embodiment the batteries 126 can be of rechargeable and/or interchangeable type, i.e. batteries that are charged outside the carriage, without the need of drawing power from the sliding contacts 22, and then used in substitution of one or more dead batteries present in the carriage.

The bracket 30 (or 130), connecting the two units 20a and 20b, advantageously comprises the side grooves 36 for housing the flexible conductors 31 visible with greater detail in FIG. 6A, which supply the electric power available from the sliding contacts 22 to the electrical apparatuses supported by the platform 32 (or 132).

Figure 6B:
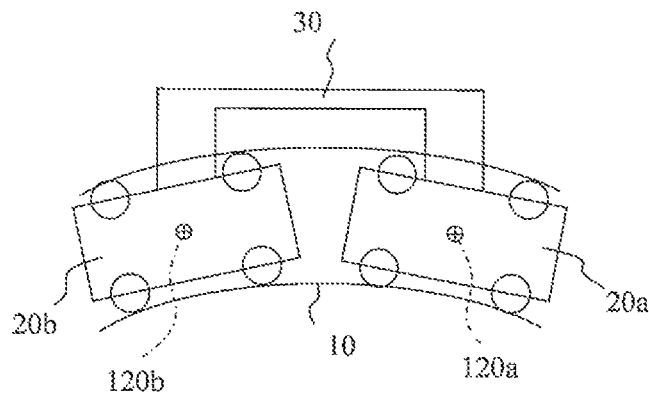
FIGS. 6B and 6C are plan views representing schematically the mutual arrangement between the bracket and the units composing the carriage of FIG. 5B at the curvilinear lengths of the track.
Figure 6C:
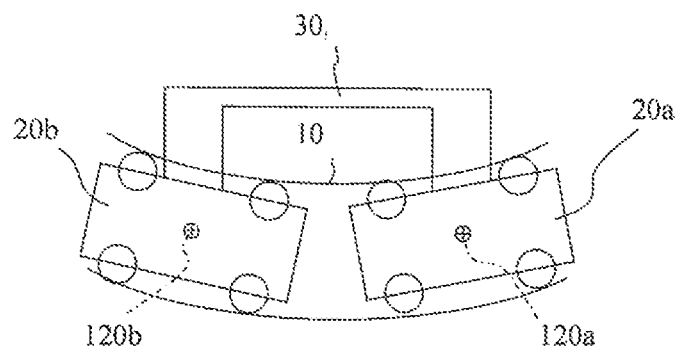

As schematically represented in FIGS. 6B and 6C, the connection between the two units 20a and 20b through the bracket 30 (or 130) with the possibility of rotation of two units with respect to the axis 120a and 120b, allows the carriage 20 to run also the curvilinear lengths of a track 10 (or 110). The shape of the bracket 30 (or 130) and respective platform 32 (or 132), as well as the size of the units 20a and 20b, contribute to determine the limit of the curvature radius of the track 10 (or 110).

The platform 32 (or 132) is further connected to the respective bracket 30 (or 130) so that to guarantee the suitable balance, in case by adding convenient counterweights depending on the electrical apparatuses mounted on the platform, which allows preventing torsional moment to the track along which the electrical apparatuses are moved.

Figure 7:
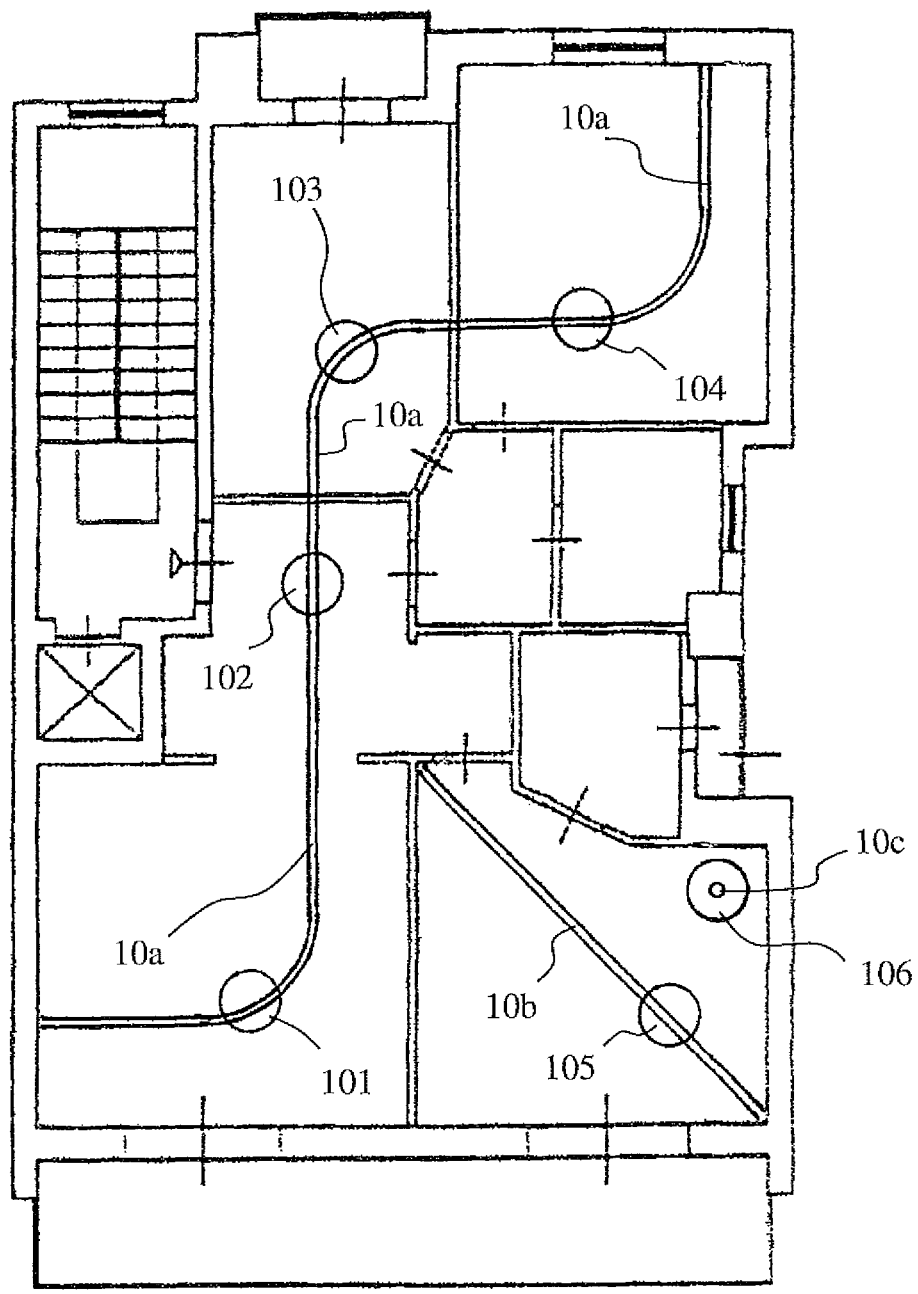
FIG. 7 is a plan view of possible installations of various systems of the present invention in a civil environment.

In FIG. 7 it is represented an installation example of systems according to the present invention in an apartment visible in plant, by using for example the type of track 10 illustrated in FIGS. 1 and 2. A first track 10a, having straight lengths and curvilinear lengths, is hung to the ceiling of the apartment, for example, and extends in three rooms. In a first room, electrical apparatuses 101 and 102 are movably supported on the track 10a, 103 in a second room and 104 in a third room.

All the apparatuses 101-104 present on the track 10a can be mutually driven as independent through convenient control units, for example one or more local units 5, as that represented in FIGS. 1, 2 and 3A. Possible safety devices or security limit switches, for example devices of mechanical, electromechanical or electronic nature, can be provided for the apparatuses 101 and 102 in order to avoid undesired collision between movable apparatuses in the same room or collisions against the apartment walls.

A second track 10b and a third track 10c are installed in the same room. The track 10b, movably supporting an electrical apparatus 105, is installed diagonally with respect to the room plant and can be hung, for example, to the ceiling as the track 10a, or else it can be constrained at its ends to the room walls, or else it can be arc-shaped and installed with an end fixed to the room floor and the opposite end free, or fixed to the ceiling or to a side wall. On the contrary, the track 10c is arranged vertically, for example with an end thereof anchored to the floor, and it bears an electrical apparatus 106 in its vertical movement. In these types of installations, although made in inner environments, also tracks 110 similar to that described in FIGS. 3A and 3B can be used, even though suitable for installations in outer environments.

In any case, all the electrical apparatuses 101-106 can be driven by a remote controlling device, for example a dedicated remote control, or else by mobile communication devices, for example smartphone or the like, and each system is anyway provided with safety devices or security limit switches for the apparatuses 101-106.

Figure 8A:
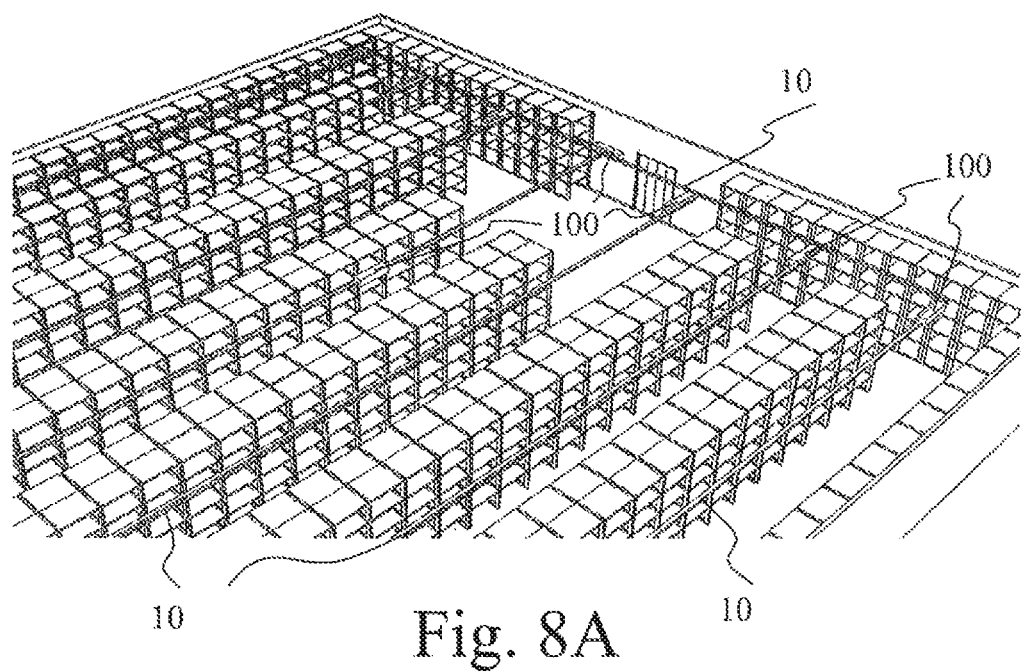
FIGS. 8A and 8B are perspective and plan views, respectively, representing a possible installation of systems of the present invention in an industrial environment.
Figure 8B:
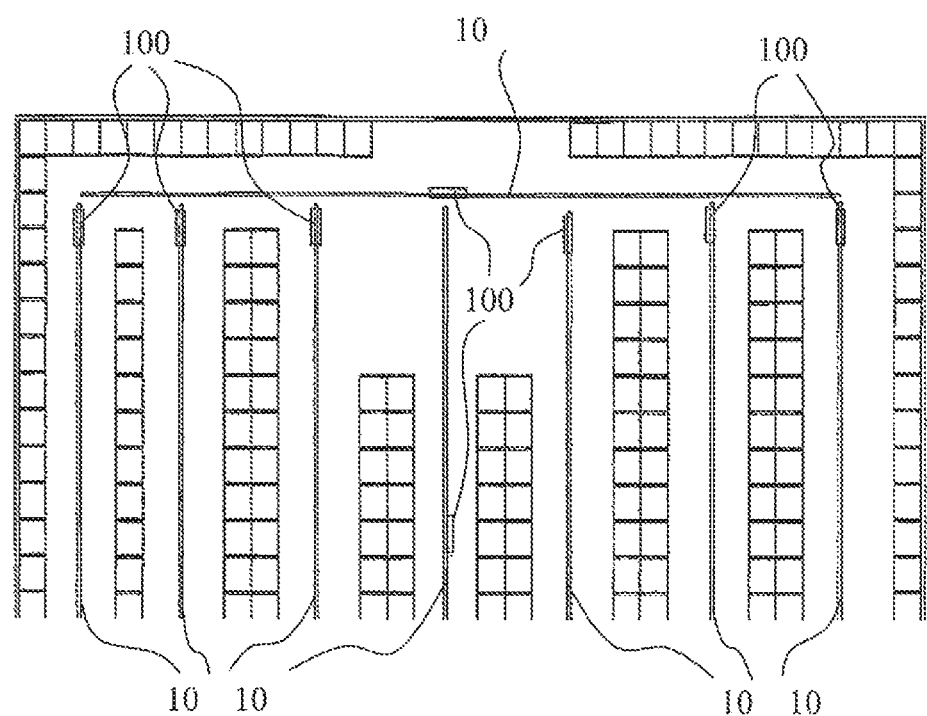

In FIGS. 8A and 8B the installation of systems according to the present invention is represented in an industrial field, for example a warehouse with shelves extending in parallel rows perpendicular one to another. The apparatuses 100 are moved along the tracks 10, (or 110) that extend parallel to the various rows of shelves to guide, for example, the operators during the load/unload operations, or also to carry out the surveillance of the space inside the warehouse when the latter is closed.

Installation examples illustrated so far for the systems according to the invention are only indicative. As a matter of fact, these systems can also be useful in other applications, for example in hotels or the like in order to guide the guests to the respective rooms and carry out the surveillance and assistance along the corridors, or also in production environments to control the machinery during the operation thereof, for example in order to guide operators through acoustic and/or visual signaling towards the points in which machine malfunctions occur, or to guard the machinery during nightly operations.

Figure 9A:
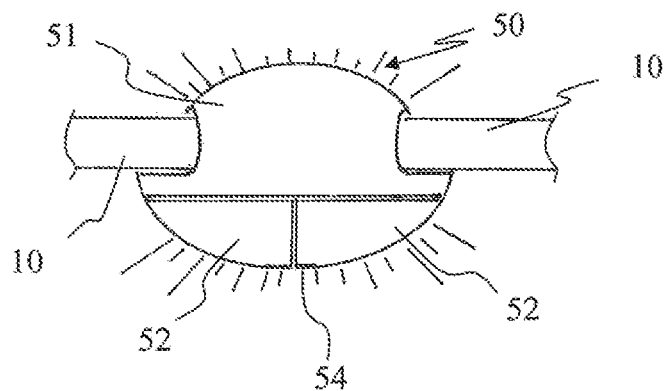
FIGS. 9A-9C are views illustrating a possible embodiment of electrical apparatuses of the system in a first use condition.
Figure 9B:
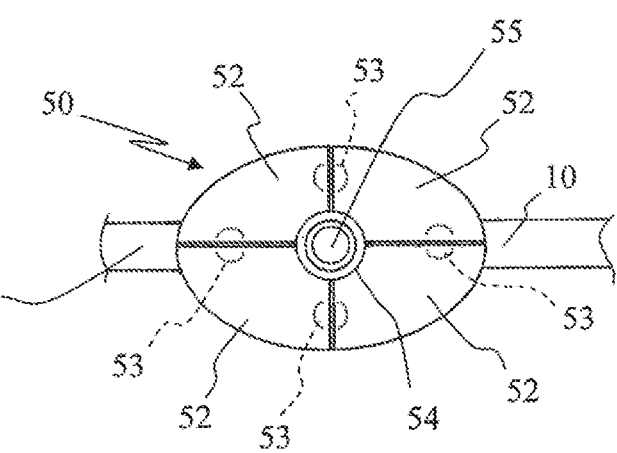
Figure 9C:
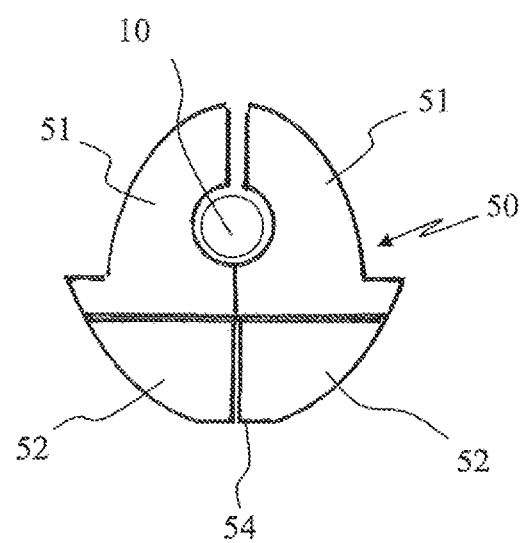

In FIGS. 9A-9C an apparatus 50 is represented as supported by a track 10 (or 110), which comprises for example a lighting lamp. The upper portion of the apparatus 50 includes two portions 51 forming the upper shell, as can be seen from the side view of FIG. 9C, and four portions 52 forming the lower shell, highlighted in the bottom view of FIG. 9B. In the latter view the four inner lights 53 are illustrated in the background, which are diffused through the shell portions 51 and 52. In the lower shell, in a central position, there is an opening 54 through which images can be captured by a video camera 55.

The apparatus 50 can be used both for lighting the environment and for capturing images through the video camera 55.

Figure 10A:
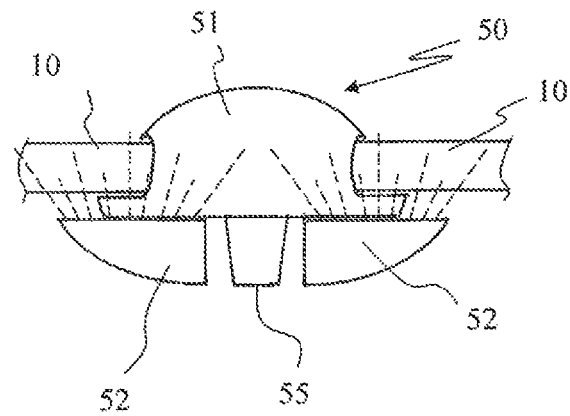
FIGS. 10A-10C are views illustrating the same apparatuses of FIGS. 9A-9C in a second use condition.
Figure 10B:
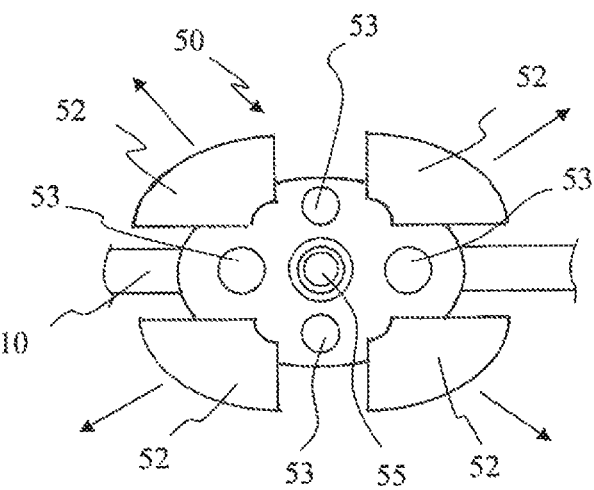
Figure 10C:
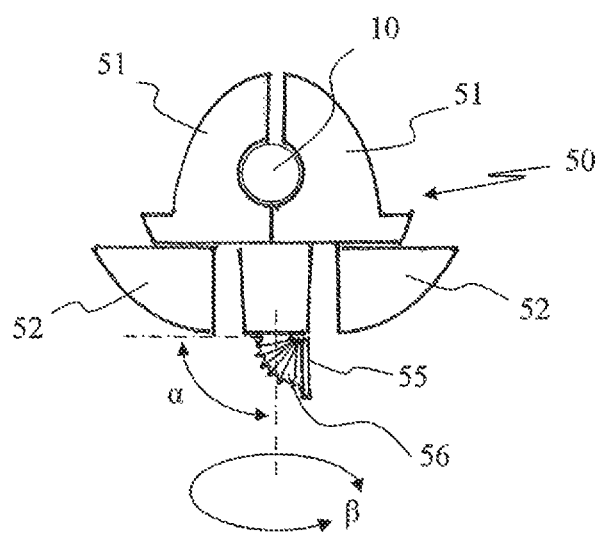

As illustrated in FIGS. 10A-10C, the apparatus 50 can be further arranged for a second use condition. In fact, the four portions 52 forming the lower shell can be translated outwards, in an open position, according the directions shown by the arrows in FIG. 10B.

When the shell portions 52 are in the open position, also additional lights can be switched on, which project light beams upwards in order to make a diffused light in the environment.

The video camera 55 can be moved in different directions for the video-, and possibly audio-, surveillance of the environment in which the track 10 (or 110) is installed. In fact, as highlighted in FIG. 10C, the video camera 55 can comprise for example an optical system 56 allowing the rotation thereof around an axis parallel to the axis of the track 10 (or 110) by an angle $\alpha$ comprised between 0° and 90°, for example, as well as a rotation around an axis perpendicular to the axis of the track 10 (or 110) by an angle $\beta$ comprised between 0° and 270°, for example. In this case the lights 53 can also be controlled automatically in order to adapt their light emission to the shot features of the video camera 55.

Various modifications can be made to the herein depicted embodiments without departing from the scope of the present invention. For example, in case in which the track 10 (or 110) is straight, the carriage 20 can also be moved by a coupling between cogwheel and cog belt, or else the carriage 20 can also be moved by coupling a nut screw with a worm. In these alternative embodiments, the motor can also be arranged outside the carriage.

The recharge of the batteries can also be done not only through the conductors arranged in the track, but also through wireless devices transferring the power by electromagnetic induction.

In addition, as an alternative to sliding contacts 22 and conductive lines 42, or in combination therewith, the electric power supply for the motor of the carriage and/or the electrical apparatuses can also be implemented by flexible conductors placed in a cable-support chain housed inside the track 10 (or 110) or coiled around an axis.

In the herein described embodiments it has been explicitly referred to the movement of apparatuses by a generic rotating electric motor. However, other types of motors can be used, for example electric linear motors, pneumatic and hydraulic motors, or any other suitable type of motors.

The electrical apparatuses moved along the track 10 (or 110) can also be different from those represented so far, and they can comprise for example one or more among a light source, a sensor for capturing images, a device for projecting and/or displaying images, or a generic sensor.

The invention claimed is:

1. A system for moving one or more electrically powered apparatuses, comprising at least one fixed supporting track along which said one or more electrically powered apparatuses are moved, said track is made by a tubular section bar having a longitudinal opening extending for its whole length and the system comprises at least one carriage movably housed inside the track and at least one motor to move said at least one carriage in the track, wherein said at least one carriage is constituted by at least one unit to which at least one bracket is mechanically connected, characterized in that the longitudinal opening is formed between an outer limb of the section bar and an inner limb of the section bar, and the outer limb being overlapped by the inner limb of the section bar, whereby along said longitudinal opening said inner limb extends a predetermined distance towards an interior side of said inner limb to define said inner limb, the at least one bracket being shaped in such a way that said at least one bracket can come out from the longitudinal opening and wherein said overlap between the inner limb and the outer limb extends substantially parallel with an intermediate portion of the at least one bracket and said overlap is at a position above a bottom surface of the at least one carriage.

2. The system according to claim 1, wherein at least one platform for supporting one or more electrically powered apparatuses is arranged outside said track and is mechanically connected to said at least one bracket that comes out through the longitudinal opening of the track.

3. The system according to claim 1, wherein said motor is an electric motor housed in said at least one carriage, and wherein said electric motor and said one or more electrically powered apparatuses are powered by conductors placed inside said track.

4. The system according to claim 3, further comprising at least one buffer battery to power said electric motor and said one or more electrically powered apparatuses.

5. The system according to claim 1, wherein said motor is an electric motor housed in said at least one carriage, and wherein said electric motor and said one or more electrically powered apparatuses are powered by a rechargeable and/or interchangeable battery.

6. The system according to claim 1, wherein said track comprises a guide channel for said at least one carriage and at least one service channel.

7. The system according to claim 1, wherein said track is constituted by modular elements connected one to another.

8. The system according to claim 1, wherein said track comprises one or more curvilinear lengths.

9. The system according to claim 1, wherein said track comprises at least one portion hung at a predetermined height from the ground or floor of an environment.

10. The system according to claim 1, wherein said track comprises at least one portion constrained by one end thereof to the ground, floor or wall of an environment.

11. The system according to claim 3, wherein said at least one carriage is moved through a cogwheel driven by the electric motor and engaged on a rack integral with the track.

12. The system according to claim 1, wherein said at least one carriage is moved by a motor transmitting the motion through the engagement between a cogwheel and a cog belt.

13. The system according to claim 1, wherein the motor of said at least one carriage and/or said one or more electrically powered apparatuses are electrically powered by contacts sliding on a plurality of conductors housed inside said track.

14. The system according to claim 1, wherein the motor of said at least one carriage and/or said one or more electrically powered apparatuses are electrically powered.

15. The system according to claim 1, wherein the one or more electrically powered apparatuses moved along said track, said electrically powered apparatuses includes one or more among a light source, a sensor for capturing images, a device for projecting, a device for displaying images, a 3D holographic projector, a microphone, an audio diffuser, or a generic sensor.

16. The system according to claim 1, further comprising at least one local control unit arranged in said track for driving the movement of said at least one carriage and/or the activation of said one or more electrically powered apparatuses, and at least one remote control unit for transmitting control signals to said local control unit.

17. The system according to claim 2, wherein said at least one carriage IS moved by a motor transmitting the motion through the engagement between a cogwheel and a cog belt.

\* \* \* \* \*